(12) United States Patent
Vijayaraghavan et al.

(10) Patent No.: US 10,311,377 B2
(45) Date of Patent: *Jun. 4, 2019

(54) CATEGORIZATION OF USER INTERACTIONS INTO PREDEFINED HIERARCHICAL CATEGORIES

(71) Applicant: [24]7.AI, INC., San Jose, CA (US)

(72) Inventors: Ravi Vijayaraghavan, Bangalore (IN); Vaibhav Srivastava, Bangalore (IN); R. Mathangi Sri, Bangalore (IN); Nitin Kumar Hardeniya, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,537

(22) Filed: Mar. 2, 2017

(65) Prior Publication Data

US 2017/0178033 A1 Jun. 22, 2017

Related U.S. Application Data

(63) Continuation of application No. 14/180,967, filed on Feb. 14, 2014, now Pat. No. 9,626,629.

(60) Provisional application No. 61/764,962, filed on Feb. 14, 2013.

(51) Int. Cl.
| | | |
|---|---|---|
| *G06F 15/18* | (2006.01) | |
| *G06N 20/00* | (2019.01) | |
| *G06F 16/35* | (2019.01) | |
| *G06N 5/02* | (2006.01) | |
| *G06Q 10/10* | (2012.01) | |
| *G06N 5/04* | (2006.01) | |
| *G06N 7/00* | (2006.01) | |

(52) U.S. Cl.
CPC ........... *G06N 20/00* (2019.01); *G06F 16/353* (2019.01); *G06N 5/02* (2013.01); *G06N 5/025* (2013.01); *G06N 5/04* (2013.01); *G06Q 10/10* (2013.01); *G06N 7/005* (2013.01)

(58) Field of Classification Search
None
See application file for complete search history.

(56) References Cited

U.S. PATENT DOCUMENTS

| | | |
|---|---|---|
| 8,055,597 B2 | 11/2011 | Acharya |
| 8,150,728 B1 | 4/2012 | Bayer et al. |
| 8,209,320 B2 | 6/2012 | Reitter et al. |
| 8,977,554 B1 * | 3/2015 | Hertschuh .......... G06Q 30/0623 704/270 |
| 2002/0116174 A1 | 8/2002 | Lee et al. |
| 2003/0115191 A1 * | 6/2003 | Copperman ...... G06F 17/30976 |
| 2005/0234753 A1 * | 10/2005 | Pinto ..................... G06Q 10/04 700/44 |

(Continued)

FOREIGN PATENT DOCUMENTS

| | | |
|---|---|---|
| GB | 2424502 A | 9/2006 |
| WO | 2005020091 A1 | 3/2005 |

*Primary Examiner* — Scott A. Waldron
*Assistant Examiner* — Ababacar Seck
(74) *Attorney, Agent, or Firm* — Perkins Coie LLP

(57) ABSTRACT

User interactions are categorized into predefined hierarchical categories by classifying user interactions, such as queries, during a user interaction session by labeling text data into predefined hierarchical categories, and building a scoring model. The scoring model is then executed on untagged user interaction data to classify the user interactions into either action-based or information-based interactions.

20 Claims, 6 Drawing Sheets

(56) References Cited

U.S. PATENT DOCUMENTS

| | | | |
|---|---|---|---|
| 2005/0234763 A1* | 10/2005 | Pinto | G06Q 30/0201 706/21 |
| 2007/0094170 A1 | 4/2007 | Graf et al. | |
| 2007/0198323 A1* | 8/2007 | Bourne | G06Q 10/00 705/7.41 |
| 2007/0198368 A1 | 8/2007 | Kannan et al. | |
| 2008/0167952 A1* | 7/2008 | Blair | G06Q 10/10 379/265.07 |
| 2008/0240379 A1* | 10/2008 | Maislos | G06F 17/30855 379/88.13 |
| 2010/0138282 A1* | 6/2010 | Kannan | G06Q 30/02 705/7.42 |
| 2010/0191658 A1* | 7/2010 | Kannan | G06F 17/279 705/304 |
| 2011/0158398 A1 | 6/2011 | Kannan et al. | |
| 2012/0076283 A1 | 3/2012 | Ajmera et al. | |
| 2012/0084086 A1 | 4/2012 | Gilbert et al. | |
| 2012/0130771 A1* | 5/2012 | Kannan | G06Q 10/06398 705/7.32 |
| 2012/0254151 A1* | 10/2012 | Reitter | G06F 17/30964 707/709 |
| 2013/0006637 A1 | 1/2013 | Kanevsky et al. | |
| 2013/0282430 A1 | 10/2013 | Kannan et al. | |
| 2013/0332200 A1* | 12/2013 | Conley | G06Q 40/08 705/4 |
| 2014/0012863 A1* | 1/2014 | Sundaresan | G06F 17/2785 707/750 |
| 2014/0046877 A1* | 2/2014 | Gopalakrishnan | G06F 17/28 706/12 |

* cited by examiner

CATEGORIZATION OF USER INTERACTIONS INTO PREDEFINED HIERARCHICAL CATEGORIES

CROSS REFERENCE TO RELATED APPLICATIONS

This application is a continuation of U.S. patent application Ser. No. 14/180,967, entitled "CATEGORIZATION OF USER INTERACTIONS INTO PREDEFINED HIERARCHICAL CATEGORIES", filed Feb. 14, 2014, which issued on Apr. 18, 2017 as U.S. Pat. No. 9,626,629, which claims priority to U.S. Provisional Patent Application No. 61/764,962, filed Feb. 14, 2013, and which are incorporated herein in their entirety by this reference thereto.

BACKGROUND OF THE INVENTION

Technical Field

The embodiments herein relate to categorizing user interactions. More particularly, the invention relates to categorizing user interactions into predefined hierarchical categories.

Description of the Background Art

Presently, customer care agents and other customer service providers handle customer queries and troubleshoot customer issues on a frequent basis. Such queries vary over a wide range of topics, each topic belonging to a different domain. In this aspect, it is difficult for a customer care agent to segregate these queries to their respective domains and answer the customer within a stipulated time because the queries belong to a various domains and differ in nature.

It would be advantageous to classify customer queries into various classes and/or categories, for example specific queries that relate to sales or services in a business.

SUMMARY OF THE INVENTION

User interactions are categorized into predefined hierarchical categories by classifying user interactions, such as queries, during a user interaction session by labeling text data into predefined hierarchical categories, and building a scoring model. The scoring model is then executed on untagged user interaction data to classify the user interactions into either action-based or information-based interactions.

DETAILED DESCRIPTION OF THE INVENTION

User interactions are categorized into predefined hierarchical categories by classifying user interactions, such as queries and other interactions, during a user interaction session by labeling text data into predefined hierarchical categories, and building a scoring model. The scoring model is then executed on untagged user interaction data to classify the user interactions into, for example, action-based or information-based interactions.

Figure 1:
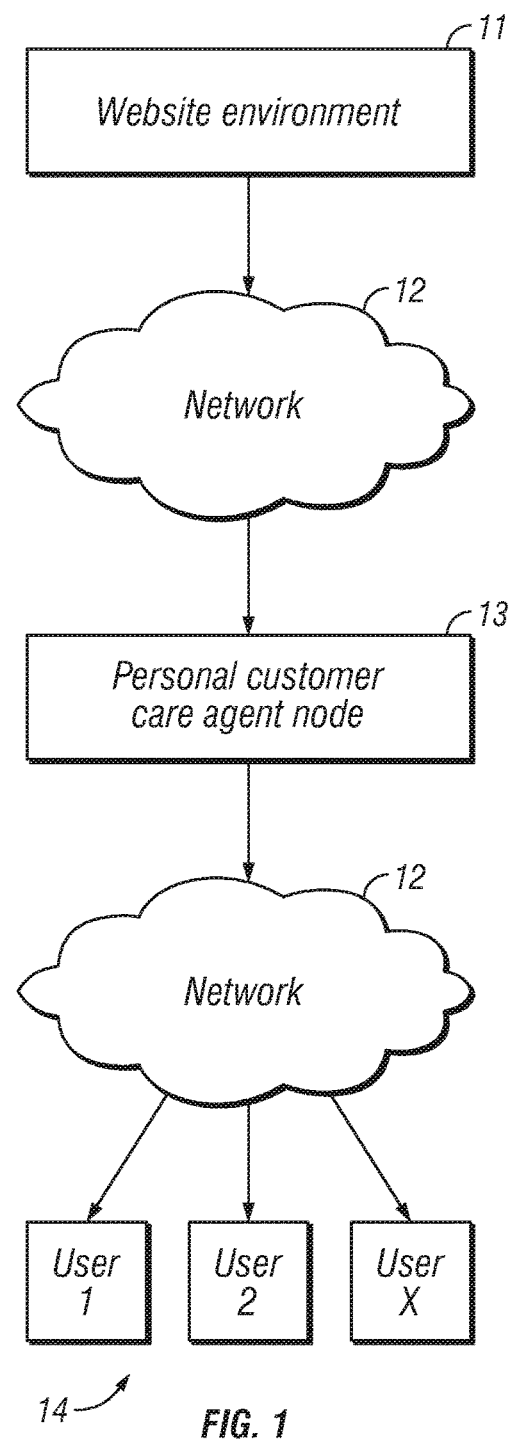
FIG. 1 is a block schematic diagram showing a customer care agent environment according to the invention.

FIG. 1 is a block schematic diagram showing a customer care agent environment according to the invention. As shown in FIG. 1, a website environment 11 and a personal customer care agent node 13 are communicably interconnected via a network 12. The personal customer care agent node is, in turn, communicably interconnected with a plurality of users 14 via the network. The customer care agent may interact with the users via various modes that comprise any one or more of online chat, surveys, forums, voice calls, and so on.

For purposes of the discussion herein, the term 'network' refers to networks that are connected to each other using the Internet Protocol (IP) and other similar protocols. Those skilled in the art will appreciate that the invention may be practiced in connection with any communications network using any communications protocol.

In an embodiments of the invention, the website environment comprises aggregated information from entity-based websites, social media websites, and other related websites, although the invention is not limited to this sort of website.

In another embodiment of the invention, the personal customer care agent is presented with user preferences in connection with obtaining information from, and presenting information to, the user, as well as for generating and publishing information based on user activity.

The personal customer care agent node includes personal customer care agent software. For purposes of the discussion herein, a node is any of a processor, a network element, a server, a computing device, a database, a hardware device, a physical storage, and a physical memory.

When a user who is connected to the network contacts a personal customer care agent, the agent receives the user's queries and either responds to the queries on his own or escalates the query to obtain a response from an appropriate entity, for example a specific department within the agent's company. The agent may have a certain window of time in which to respond to the user's queries. The agent may also have to categorize queries based on their nature.

Figure 2:
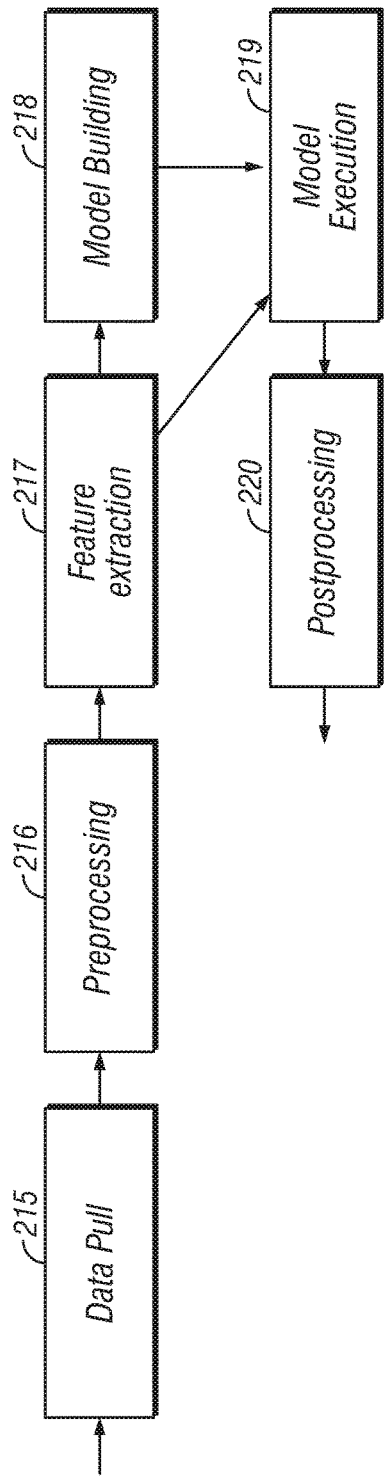
FIG. 2 is a flow diagram showing query categorization into predefined categories according to the invention.

FIG. 2 is a flow diagram showing query categorization into predefined categories according to the invention. In FIG. 2, text data is received (215), for example from a chat session, and a preprocessing step is performed (216). Features are extracted from the text (217) and a model is built (218) in a model building phase. Once the model is built, the model execution phase commences (219), in which extracted features are provided to the model. Thereafter, post processing (220), such as for example, dictionary lookups based on predicted queries, suggesting actions based on lookup queries, cross-tabulation based on another structured variable with the predicted queries, or generically building any reporting summary tables using the predicted labels, is performed FIGS. 3A and 3B are block schematic diagrams showing query categorization and model execution according to the invention.

Figure 3A:
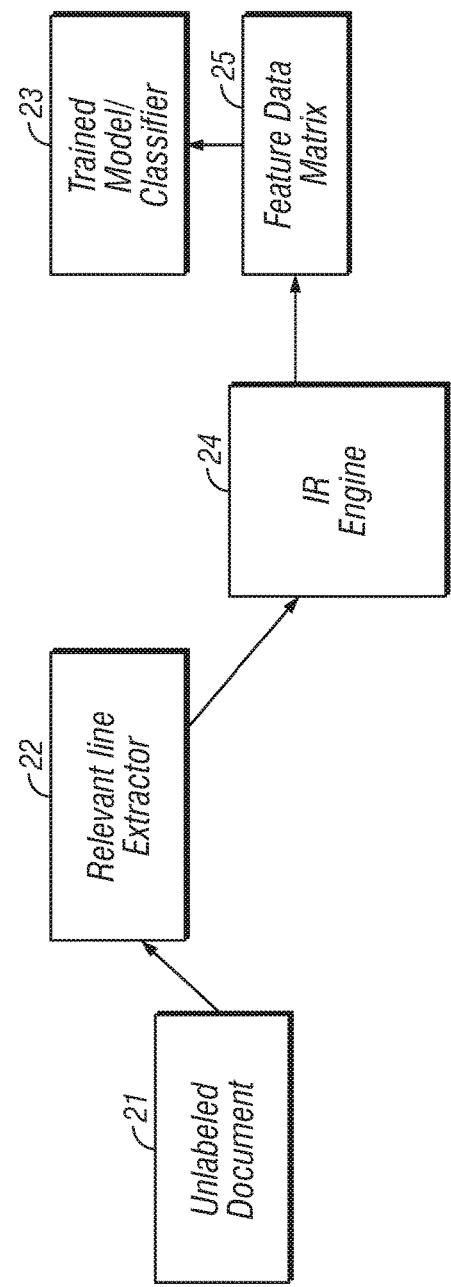
FIGS. 3A and 3B are block schematic diagrams showing query categorization and model execution according to the invention.
Figure 3B:
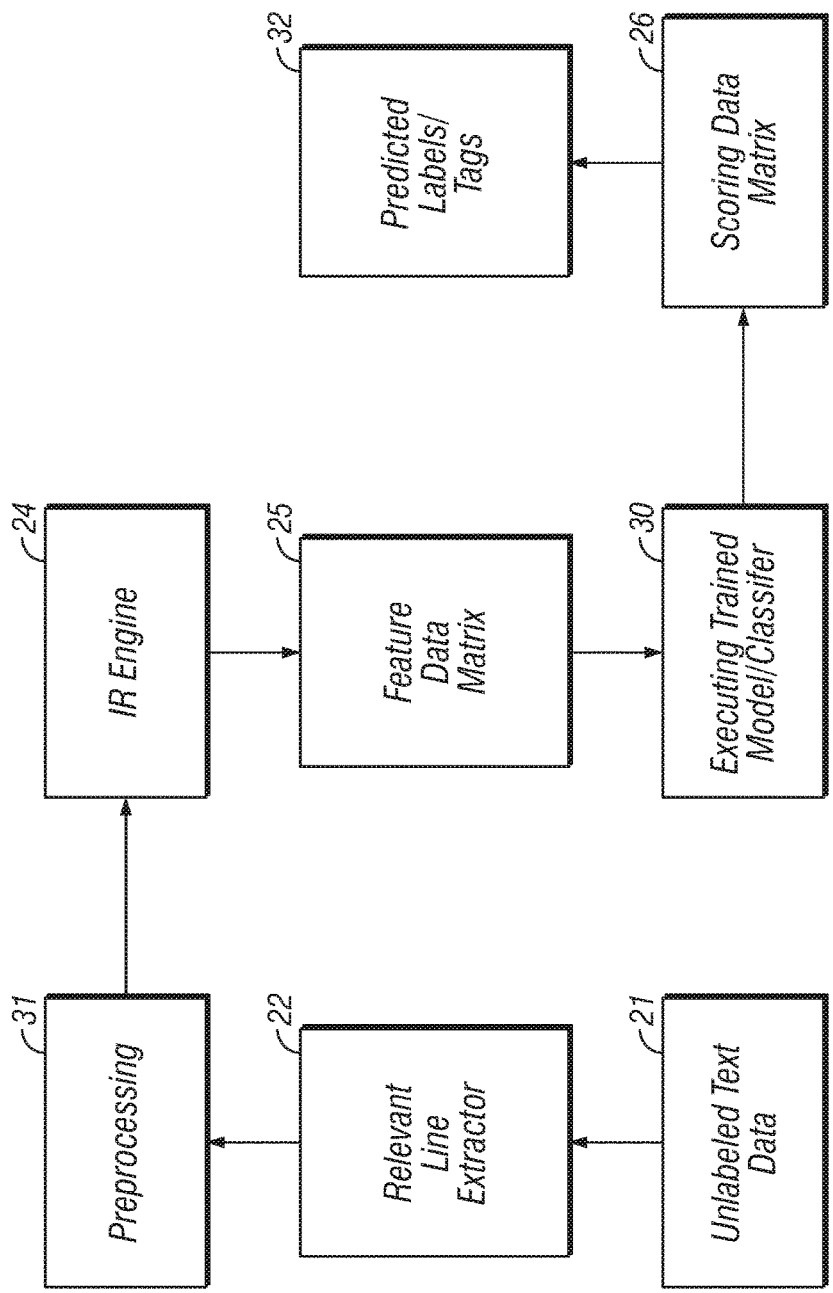

FIG. 3A shows the process of model scoring or model execution, wherein a trained model 23 is applied to user interaction data to classify and label the corresponding text data. As shown in FIG. 3A, the process of query categorization creates a system for labeling text data into predefined hierarchical categories. Labeled text data is text data that is transformed into a vector of features, such as the presence of a word, position of words, POS tags, counts, term frequencies, term frequency—inverse document frequency (tfidf), etc. This transformed vector becomes a feature vector X having labels y. The model building process identifies the unknown functional relationship f for Y=f(x) from historical chat data. The model scoring process predicts an unknown y using the learned function f for new chat data transformed to new x.

Query categorization proceeds when an unlabeled document 21 is provided to a relevant line extractor 22. The relevant line extractor uses business heuristics to extract only those lines in the text of the unlabeled document that are relevant. For example, a heuristic business rule for extracting a primary issue line looks at the first line of text received from the customer that follows a greeting line by the agent but ignores the greeting line. For purposes of the discussion herein, the text may be obtained from chats, transcribed calls, forums, surveys, or any other suitable source. Relevant lines are those which are important for labeling. Extraneous and/or irrelevant lines, phrases, or tags such as greetings, welcome tones, and so on are removed from the chat by the relevant line extractor, i.e. a chat filter. While relevant line extraction is especially critical in chats, it is useful across all formats of text data, e.g. tweets, IVR, transcribed text, etc. Relevant line extraction may be implemented by any generic algorithm to extract relevant lines of text, e.g. extracting noun phrases only, extracting specific text phrases, extracting only agent lines, extracting only customer lines, extracting customer lines with sentiments, extracting question lines, etc.

The output of the relevant line extractor is input into an information retrieval (IR) engine 24 and feature data matrices 25 are output. For example, a feature data matrix is formed by combining the feature vectors for all historical chat text data. The feature data matrix is created from cleansed, transformed, and structured representations of the original, transcribed or typed and unstructured text interaction history. These representations can also be combined with additional structured data gathered by the platform or system, for example, interaction times, Web traversal history, etc.

In embodiments of the invention, the lines of text may be preprocessed (see FIG. 4), which may involve several steps such as reshaping data; masking text patterns, for example different date patterns, digit patterns, phone numbers, credit card numbers, company names, URLs, etc.; converting to lower case; removing numbers; removing punctuation; tokenization; stemming; part-of-speech tagging; lemmatization; etc.

In embodiments of the invention, the IR engine 24 is a rule evaluator that scores every document against the model 23 which is run along with the text data. Based on rules that hit each text data point, each such data point is given a score for each of the categories. The result is a feature data matrix 25 which is produced for each level in a category tree.

The model/classifier 23 obtains the feature data matrices and uses different classification algorithms via a scoring data matrix 26 to label them, thus producing predicted labels 32. The matrices comprise cleansed, transformed, and structured representations of the original, transcribed or typed and unstructured text interaction history. These representations may also be combined with additional structured data gathered by the platform or system, for example, interaction times, Web traversal history, etc. The classifier or the model may be built in a supervised or an unsupervised approach.

Supervised models require tagging or manual annotation, i.e. labeling of data, from which the model learns in the model building or model learning process.

Some examples of supervised models or classification algorithms include, decision trees, SVMs, random forests, logistic regression, etc.

Unsupervised models may also be used, such as, kmeans clustering, hierarchical clustering, etc.

Once the model is trained, i.e. during model building, by providing labeled response variables and a set of structured input features, and further validated for model lift, accuracy, etc. during a model testing or model validation phase, the model may be used for model scoring. In model scoring, for a given set of structured input features, the model can predict the response variable.

FIG. 3B depicts the process of model building from trained data samples, wherein text interactions are labeled, annotated, or tagged during a tagging process from which a model is built. As shown in FIG. 3B, the model 23 (FIG. 3A) comprises machine learning models, such as, decision trees, SVMs, random forests, rules, etc., that are based on predicted tags 32. In embodiments of the invention, the model can also be modified and/or edited based on user rules or requirements. For example, additional rules may be added by the user. For example, an additional rule for purchase query category may be added, e.g. "if chat text contains purchase or buy, category is purchase query." In this way, a model built on interaction data from one client may become applicable to a different client in the same or similar domain because the feature vectors that are used for model building or the rules of the model may be applicable to it During model execution 30, the model and unlabeled text data are obtained and classified into user interactions that are either action-based or information-based chats (see FIG. 3A). In FIG. 3B, unlabeled text data is input to a relevant line extractor 22, preprocessed 31, and thereafter provided to model execution 30. A model and the preprocessing module 31 are used to parse the chat sessions and extract relevant or important features. The features may be, for example, most frequent n-grams; most discriminatory n-grams; rules, e.g. AND, OR, proximity, or any other more complex rules; any structured data, such as, handle times, delays in response, etc. In an embodiment, the rule extraction system uses a natural language model to extract the part of speech (POS) tags that can be used as features. The feature selection may be performed based on mutual information, binormal separation, tf-idf, pca, or any other machine learning algorithm.

The output of the rule extraction system is provided to the model execution module, which is responsible for building machine learning models based on the predicted tags 32. During a model execution stage, the classifier or model 23 is applied to the unlabeled text data 21 to classify the chats into either an action-based chat session or an information-based chat session. The chats may also be further categorized into sub-categories of an information-based or action-based type of chat. Examples of sub-categories can include, 'mail sent,' 'agent provided customer the steps to resolve the issue,' 'agent provided the customer with information about the current air fares,' 'agent changed the status of a customer,' and so on.

The rule extraction system extracts different rules, i.e. features, that qualify the text and then checks the distribution of the extracted features across different categories hierarchically. Based on the relevance of the categories, the rule extraction system provides scores. The top rules for each category, based on their scores, are written in a model file 23 which can be read and edited manually.

Figure 4:
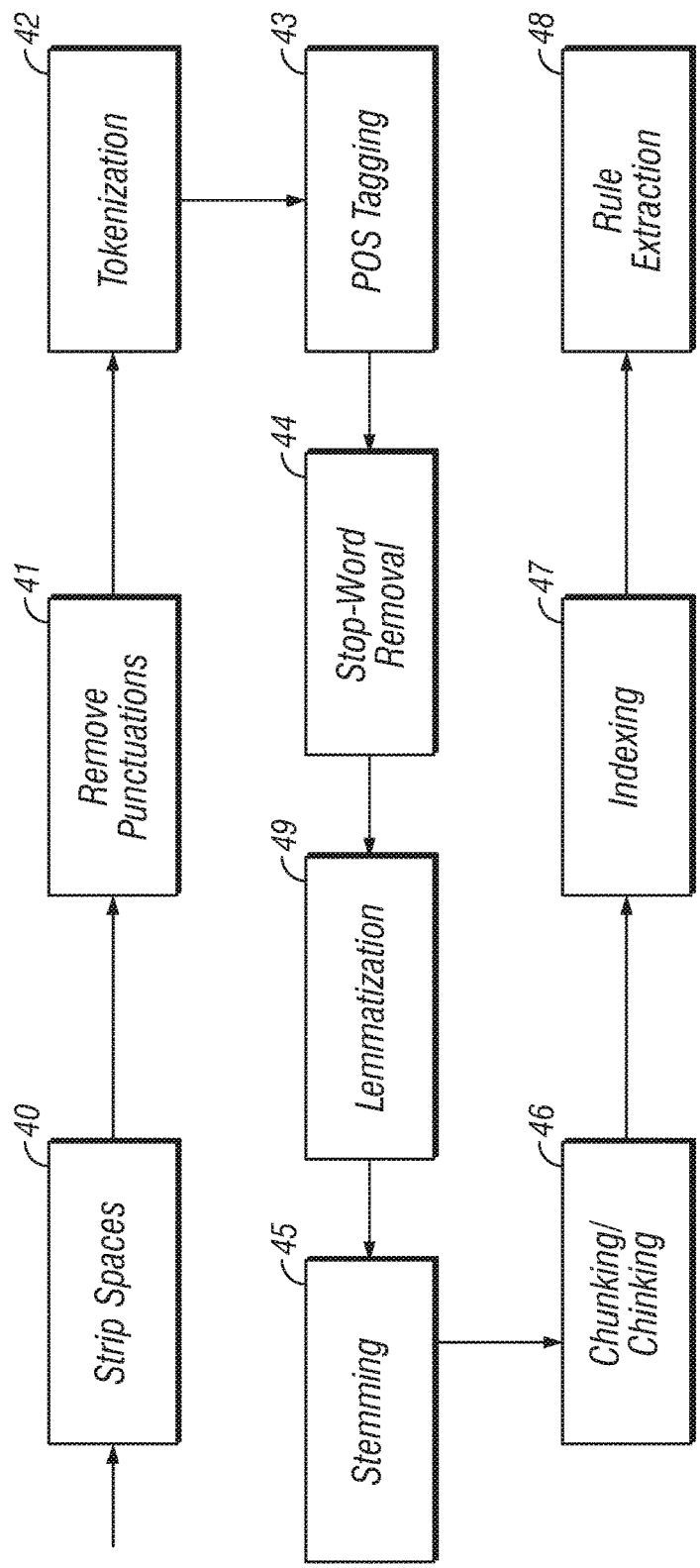
FIG. 4 is a block schematic diagram showing preprocessing according to the invention.

In embodiments of the invention, the source of text is a chat session transcript in the form of text chat that is transcribed text or that is obtained through social media, forums, and the like. The process of classifying resolutions in a chat session comprises three phases, including a training phase, a testing phase, and an application phase. Examples of a resolution of one or more queries include an information-based query where an agent provides price information for a product, or provides detailed information regarding product insurance, in response to corresponding customer queries. Examples of an action request-based query include an agent canceling services on request of a customer, or the agent updating account information on behalf of the customer. The chats are labelled for the resolution type, and the model is trained, validated, and then used for scoring, as depicted in FIGS. 3A and 3B, in a similar fashion as described for query categorization process above FIG. 4 is a block schematic diagram showing preprocessing according to the invention. In FIG. 4, spaces are stripped 40 from the lines of text, punctuation is removed 41, tokenization is performed 42, POS tagging is performed 43, stop words are removed 44, lemmatization is performed 49, stemming is performed 45, chunking and chinking is performed 46, and the text is indexed 47. Thereafter, rule extraction is performed 48, as described above.

Figure 5:
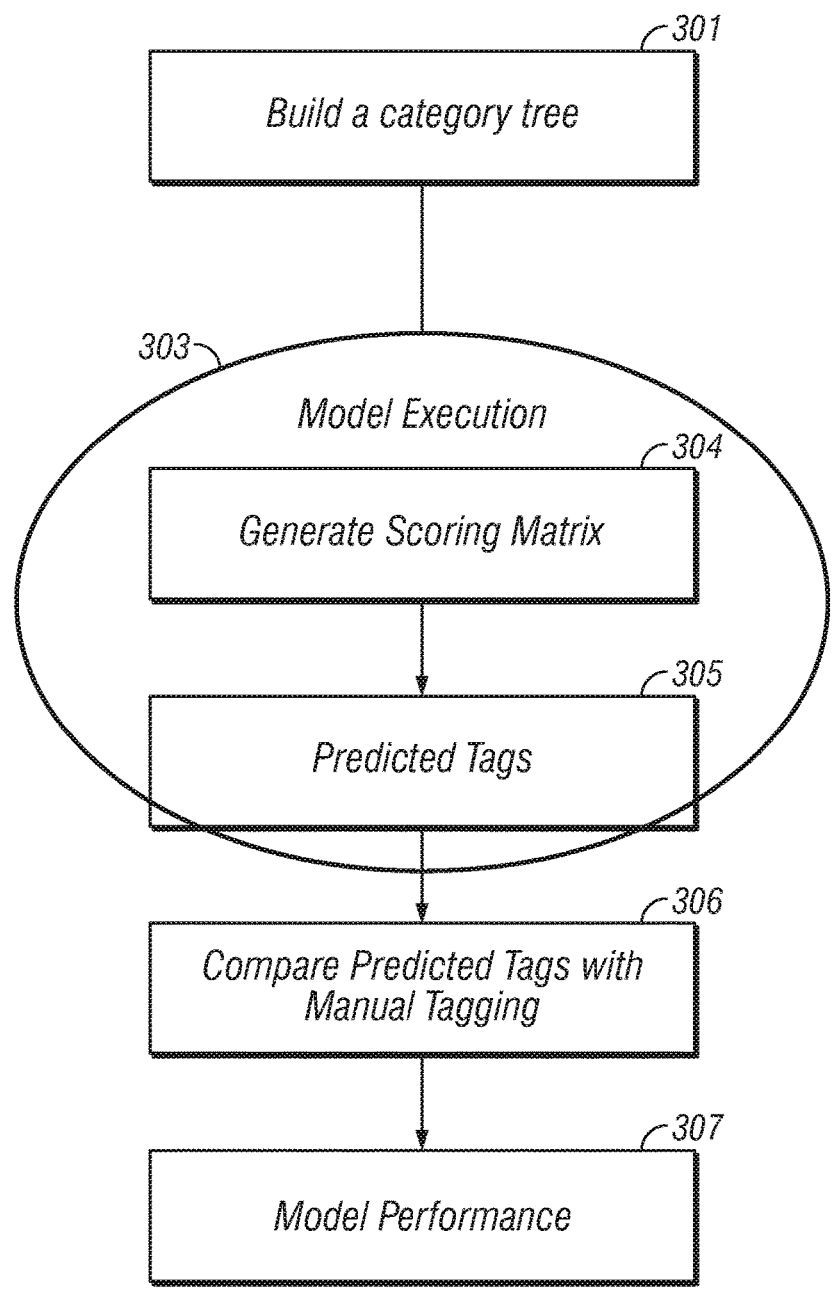
FIG. 5 is a flow diagram showing classification of issues in chat according to the invention.

FIG. 5 is a flow diagram showing classification of customer queries or issues in chat according to the invention. There are typically two different types of issues that a user wants to address during an interaction session. The user may either seek information from an agent or the user may put forth an action oriented request to the agent.

Initially, a text filter filters the relevant sections in the interaction session. The lines of text may be preprocessed, as described above, which involves several steps such as reshaping data; masking text patterns, for example different date patterns, digit patterns, phone numbers, credit card numbers, company names, URLs, etc.; converting to lower case; removing numbers; removing punctuation; tokenization; stemming; part-of-speech tagging; lemmatization; etc. The feature extractor extracts important features from the interaction session, from the preprocessed or the original chat text.

To categorize the different kinds of issues in a session, a category tree is initially built (301) to segregate issues into different categories. These categories generally cover all of the issue categories that relate to the business or domain in question. For example, in embodiments of the invention the categories cover a range of billing related issues, such as late payment, miscellaneous charges, and so on; or payment related issues.

The features created in the training phase can include rules, such as features based on POS tags, word counts, position of words, presence of unigrams, bigrams, trigrams, or higher order ngrams, presence of a first word AND a second word (AND rule), presence of a first word OR a second word (OR rule), proximity rules such as NEAR, directional proximity rules such as ADJACENT, proximity rules operating within a limited scope or window of words or characters, negation rules such as NOT, etc. The rules help to extract relevant features during the session.

Once the features are created, a training phase is implemented (303) and the relevant lines or phrases are extracted.

During a pre-processing session, the text may also be generalized by replacing specific words with standard words. For example, the feature extractor recognizes a word such as 'obtain' instead of 'take' or 'get.'

A scoring matrix is generated (304) based on the scores for each category for each chat transcript in the entire corpus of chat texts, and the matrix is then given a score based on the relevance of the matrix generated. The score obtained is based on a comparison between the rules created and the category tree.

Based on the predicted categories (305) of customer queries above, the process of classifying issues in a chat helps the agent to respond to customer queries quickly and to transfer or direct the customers to a concerned department appropriately. The issues may be pre-defined into hierarchical categories.

The model may be tested by comparing the predicted tags with manual tagging (306) and model performance can be determined based upon the comparison (307).

The various actions in the exemplary method shown on FIG. 5 may be performed in the order presented, in a different order, or simultaneously. Further, in some embodiments of the invention, some actions listed in FIG. 5 may be omitted.

Computer Implementation

Figure 6:
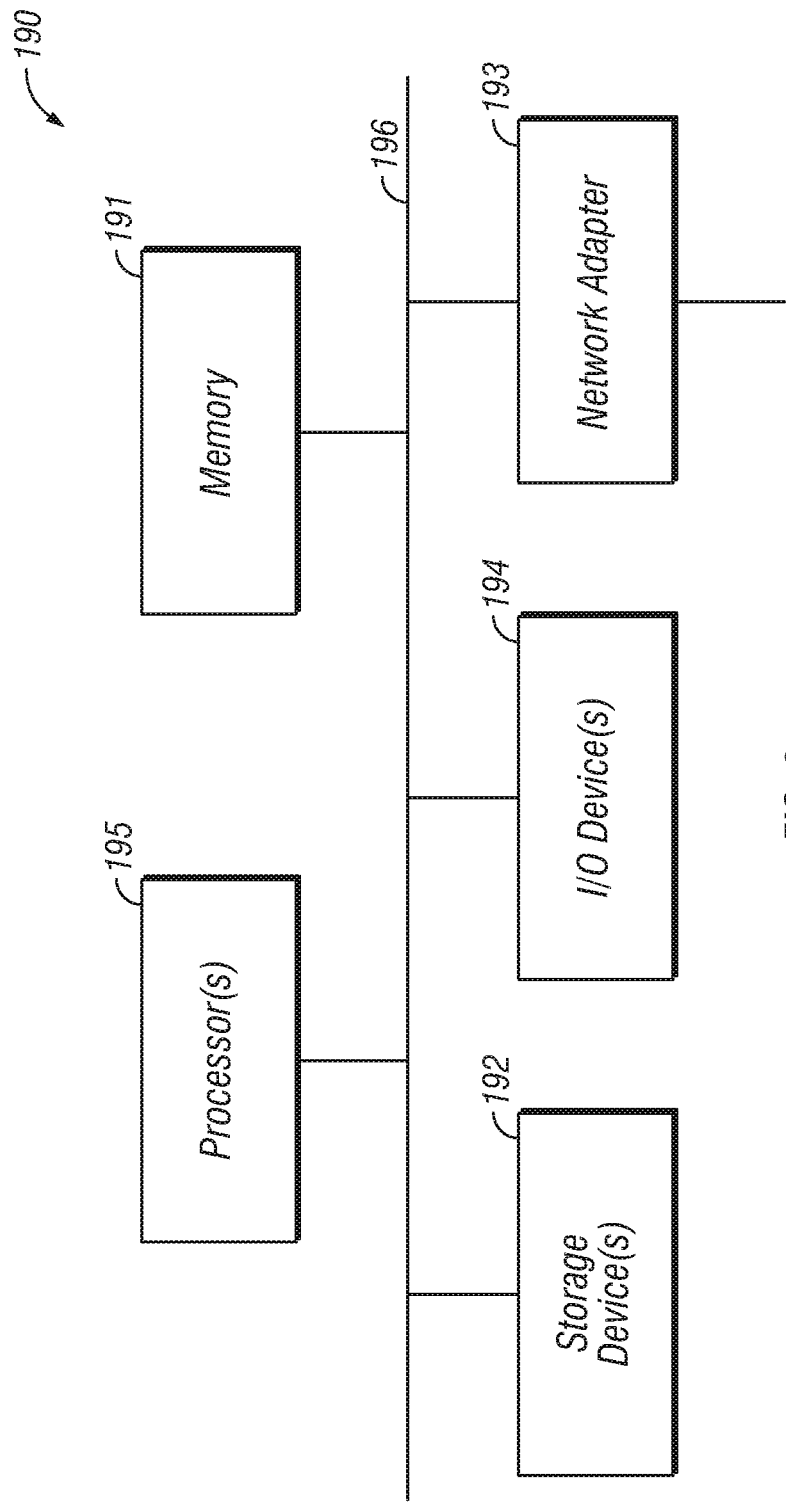
FIG. 6 is a block schematic diagram showing a machine in the example form of a computer system within which a set of instructions for causing the machine to perform one or more of the methodologies discussed herein may be executed.

FIG. 6 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 190 may include one or more central processing units ("processors") 195, memory 191, input/output devices 194, e.g. keyboard and pointing devices, touch devices, display devices, storage devices 192, e.g. disk drives, and network adapters 193, e.g. network interfaces, that are connected to an interconnect 196.

In FIG. 6, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 191 and storage devices 192 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 191 can be implemented as software and/or firmware to program one or more processors to carry out the actions described above. In some embodiments of the invention, such software or firmware may be initially provided to the processing system 190 by downloading it from a remote system through the computing system, e.g. via the network adapter 193.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented method for categorization of user interactions into predefined hierarchical categories, comprising:
building a scoring model configured to convert a raw dataset into predefined hierarchical categories by extracting response variables and a set of structured input features from another raw dataset and identifying a functional relationship among the extracted response variables and features, the another raw dataset comprising text lines derived from a plurality of user interaction sessions;
executing, by the processor, the scoring model on the raw dataset to classify and label the raw dataset into predefined hierarchical categories comprising any of action-based and information-based interactions, the raw dataset comprising text lines derived from a contemporaneous user interaction session,
wherein the scoring model is based on response variables and a set of structured input features, the response variables being associated with another raw dataset comprising text lines derived from a plurality of user interaction sessions; and
based upon the predefined hierarchical categories, the processor aiding the contemporaneous user interaction session by automatically routing a user of the contemporaneous user interaction session to a channel associated with an appropriate department.

2. The method of claim 1, wherein the text lines from the user interaction sessions are a contemporaneous transcription of an exchange between a live agent and one or more users.

3. The method of claim 1, further comprising:
the processor providing a received unlabeled document to a relevant line extractor; and
the relevant line extractor extracting from the unlabeled document only those lines in the text of the unlabeled document that are relevant.

4. The method of claim 3, further comprising:
inputting an output of the relevant line extractor and the scoring model to an information retrieval (IR) engine; and
responsive thereto, the IR engine outputting data matrices.

5. The method of claim 4, further comprising;
preprocessing the text lines from the relevant line extractor by any of reshaping data; masking text patterns which comprise any of different date patterns, digit patterns, phone numbers, credit card numbers, company names, and URLs; converting to lower case; removing numbers; removing punctuation; tokenization; stemming; part-of-speech tagging; and lemmatization.

6. The method of claim 4, further comprising:
the IR engine evaluating one or more rules to score every received unlabeled document against the scoring model; and
based on rules that hit each text data point, giving each such data point a score for each of the predefined hierarchical categories;
wherein a data matrix is produced for each level in a category tree.

7. The method of claim 6, further comprising:
a classifier receiving the data matrix for each level in the category tree;
the classifier using at least one classification algorithm to label the data matrices,
wherein the labeled data matrices yield labeled documents that comprise cleansed, transformed, and structured representations of an original, transcribed or typed and unstructured text interaction history.

8. The method of claim 7, further comprising:
combining the cleansed, transformed, and structured representations with additional structured data.

9. The method of claim 7, further comprising:
building any of the classifier and the scoring model using a supervised or an unsupervised approach.

10. The method of claim 1, wherein the processor classifies and labels the raw dataset during the user interaction sessions by labeling the raw data, including data that has not been transformed into a vector of one or more vectors, into the predefined hierarchical categories.

11. The method of claim 1, further comprising:
building the scoring model in response to receiving labeled response variables and a set of structured input features;
validating the scoring model by determining whether an output of the scoring model agrees with a predicted response variable, given an input including the set of structured input features.

12. The method of claim 1, further comprising:
using the scoring model across different businesses in a same or similar domain, even if the businesses are not part of a training data set.

13. The method of claim 1, further comprising:
while executing the scoring model, the processor receiving the scoring model and the raw dataset; and
the processor classifying the raw dataset into predefined hierarchical categories.

14. The method of claim 13, further comprising:
a relevant line extractor receiving raw data; and
the relevant line extractor outputting data to a model extraction module, the model extraction module using the scoring model and a rule extraction system to parse user interaction sessions and extract relevant or important features therefrom to build machine learning models based on tagged data;
wherein the features comprise any of most frequent n-grams; most discriminatory n-grams; rules comprising any of AND, OR, or proximity rules; any structured data comprising any of handle times and delays in response.

15. The method of claim 14, further comprising:
the rule extraction system extracting different features that qualify text;
the rule extraction system checking distribution of the extracted features across different categories hierarchically; and
based on relevance of the categories, the rule extraction system providing scores.

16. The method of claim 13, further comprising:
categorizing the user interactions into sub-categories of an information-based or action-based type of chat.

17. An apparatus for categorization of user interactions into predefined hierarchical categories, comprising:
a processor having memory, the processor programmed with machine instructions that classifies a raw dataset comprising text lines contemporaneously transcribed from a user interaction session, the machine instructions comprising:
building a scoring model configured to convert the raw dataset into predefined hierarchical categories by extracting response variables and a set of structured input features from another raw dataset and identifying a functional relationship among the extracted response variables and features, the another raw dataset comprising text lines derived from a plurality of user interaction sessions;
executing the scoring model on the raw dataset to classify and label the raw dataset into predefined hierarchical categories comprising any of action-based and information-based interactions; and
based upon the predefined hierarchical categories, aiding the user interaction session by automatically routing the users to a channel associated with an appropriate department.

18. The apparatus of claim 17, further comprising:
building the scoring model in response to receiving labeled response variables and a set of structured input features; and
validating the scoring model by determining whether an output of the scoring model agrees with a predicted response variable, given an input including the set of structured input features.

19. A computer implemented method for query categorization into predefined hierarchical categories, comprising:
building a scoring model configured to convert a raw dataset into predefined hierarchical categories by extracting response variables and a set of structured input features from a first raw dataset and identifying a functional relationship among the extracted response variables and features, the first raw dataset comprising text lines derived from a plurality of user interaction sessions;
executing, by a processor, the scoring model on the raw dataset to classify and label the raw dataset into predefined hierarchical categories comprising any of action-based and information-based interactions, the raw dataset comprising text lines contemporaneously transcribed from a user interaction session wherein the scoring model is based on response variables and a set of structured input features, the response variables being associated with another raw dataset comprising text lines derived from a plurality of user interaction sessions; and
based upon the predefined hierarchical categories, aiding the user interaction session by automatically routing a user to an appropriate department for service by a live agent.

20. The computer implemented method of claim 19, further comprising:
implementing, by the processor, a text filter for filtering sections of the text lines of the interaction session and a text parser for parsing the text lines and for extracting features from the interaction session.

* * * * *